56. HARVESTERS.
763
EXAMINER'S ROOM.
2 Sheets—Sheet 1.
E. B. FORBUSH.
Harvester.
No. 376.
Reissued July 8, 1856.
Fig. 1,
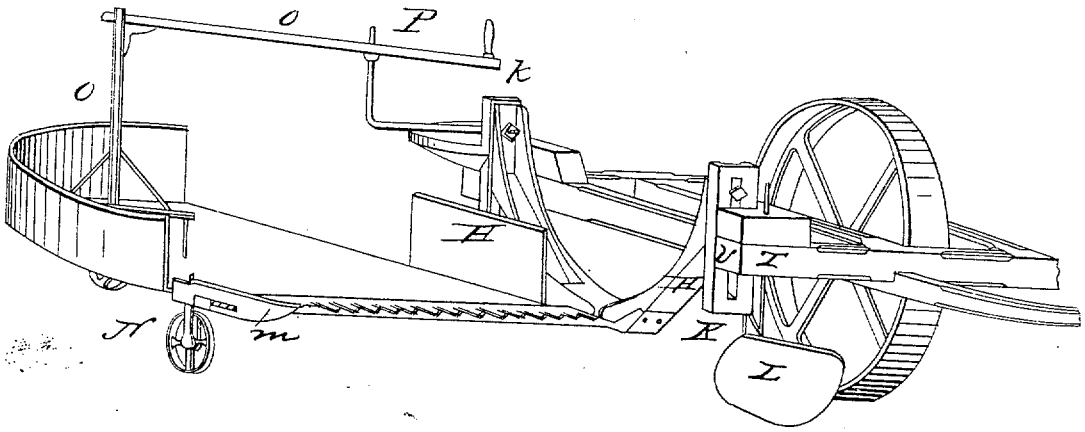

EXAMINER'S ROOM.
2 Sheets—Sheet 2.
E. B. FORBUSH.
Harvester.
No. 376.
Reissued July 8, 1856.
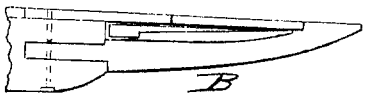
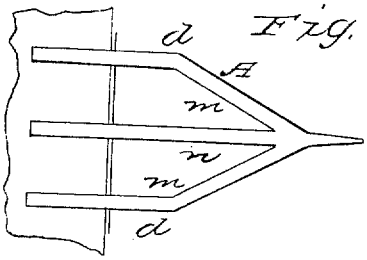
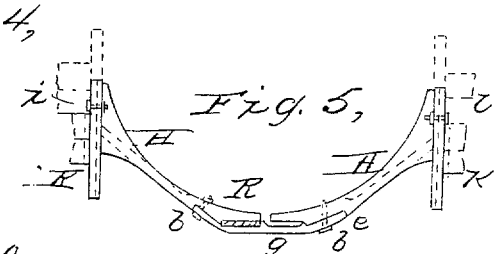
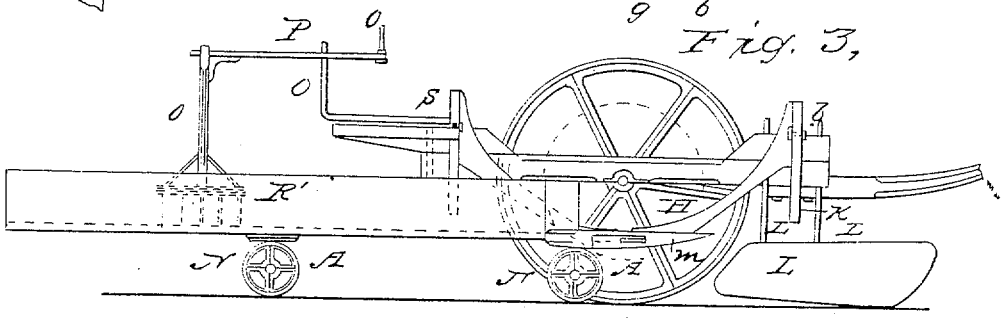
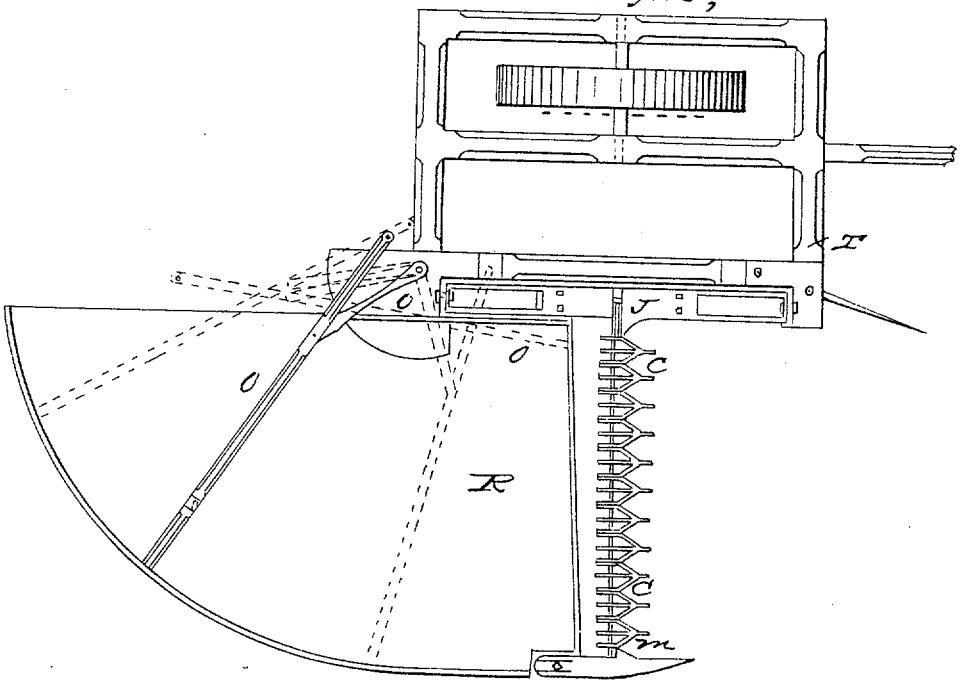
N. PETERS, Photo-Lithographer, Washington, D. C.

UNITED STATES PATENT OFFICE.

ELIAKIM B. FORBUSH, OF BUFFALO, NEW YORK.

IMPROVEMENT IN GRAIN AND GRASS HARVESTERS.

Specification forming part of Letters Patent No. 9,134, dated July 20, 1852; Reissue No. 376, dated July 8, 1853.

*To all whom it may concern:*

Be it known that I, ELIAKIM B. FORBUSH, of the city of Buffalo, in the county of Erie and State of New York, have invented certain new and useful Improvements in Grain and Grass Harvesting Machines; and I do hereby declare that the following is a full and exact description thereof, reference being had to the annexed drawings and figures and letters of reference marked thereon, making a part of this specification.

The nature of my invention consists in the following particulars, to wit: first, in the construction of new and improved guard-fingers which possess several distinct points of improvement, as hereinafter described; second, in dropping that part of the frame down to the ground herein called the "clamp," for the uses and purposes as hereinafter more fully set forth; third, in the construction of a new and improved mold-board with an up-and-down motion to work forward of the finger-bar to prevent the mown grass from again coming in contact with the cutters; fourth, in the construction of a new and improved rake-off for grain. This improvement consists in making a right-angled stanchion, with a pivotal motion on the frame-work of the machine, and supporting upon the upright half of this stanchion a lever to which is attached a rake.

To enable others skilled in the art to make and use my said improvements, I will proceed to describe the construction and operation of each.

I. I make my improved guard-fingers—of which A in Fig. IV is a top view, and B a side view—in three ways, to wit: first, by casting from hard iron and malleable iron; second, by forging from wrought-iron; third, by making the upper half of steel and casting or forging the ower half, and then braze or fasten the two parts together at the pointed end. Guard-fingers made in either way will answer the purpose, and either plan of construction may be adopted as circumstances may require. By adopting the form and ideas of the guard-finger herein described I am enabled to obtain in its mechanical action the following distinct points of improvement, to wit:

First, an inside bar or middle finger (represented at *n*, Fig. IV) to facilitate the cutting and clearing process. This inside bar or middle finger, *n*, serves to separate, cut, and remove any stray straws or other substance which may escape being cut against the outside brace-bar, *m*, and which may happen to be drawn in under it. I thus nearly double the chances of severing every particle of fibrous substance which comes within the range of the cutters.

Second, an opening or open spaces in its upper half to afford an escape for the fine grass, dirt, and fibrous matter which may happen to be drawn in between the guard and cutter. Experience has proved, in using the common straight guard, that in certain conditions of the grass small particles of fine grass, gummy and fibrous matter will work into the slit in the guard and become deposited and packed on the surface of the cutters and in the slit. This matter is liable to accumulate to such an extent as to clog and wedge the cutters, unless there is some remedy to prevent it. To afford a remedy for this difficulty I so construct my guard as to make an opening or open spaces in the top thereof, through which the dirt, fine grass, and fibrous matter may escape before they becomes hard and packed. The open spaces are formed by the peculiar construction of the guard, and by which form and construction several additional purposes are also accomplished, as herein set forth. A portion of the upper half projects over the under half, as already expressed, by the brace-bar or projecting part *m*, Fig. IV. This projecting or overhanging part serves a threefold purpose in addition to the open space.

First. It strengthens the guard and forms a brace, so that the guards, when arranged on on the finger-bar, mutually brace and support each other, as represented at *c c*, Fig. II, and hence are more substantial and are less liable to break or bend than if made in the common straight form.

I do not claim to be the original inventor of bracing the guards when arranged together on the finger-bar, as I am now apprised that Obed Hussey, of Baltimore, did the same, in substance, as early as 1847.

Second. A second and important idea to be realized in the construction of the guard with a projecting or overhanging part is to sever the stalks of grass and grain at a greater distance from the center line of the guard than has heretofore been done in the use of the common straight guard. To realize this idea and give it a practical effect, the cutters are required to do a portion of their cutting against this brace-bar or overhanging part at the greatest practicable distance from the dead point or extreme limit of their vibrating motion, thereby affording the dirt, fibrous, and other matter which may pass in (in the process of severing,) also an opportunity to pass out at the openings before it is carried under the center bar, *n*, or center line of the guard, and before the cutters have taken their return motion, and thus prevent the cutters from clogging.

Third. A third idea practically developed by this form of guard is this: The part which overhangs in rear of the cutting-edge of the cutters serves the purpose to loosen and scrape up the gummy and fibrous matter which may be inclined to collect on the surface of the cutters, and thus prevent it from passing in and wedging under the straight or center bar, *n*. In the form represented in Fig. IV the part which overhangs in rear of the angle *d* accomplishes this purpose effectually, for the reason that it acts on the entire surface of the cutters in rear of the cutting-edge.

Fourth. Forming the guard in two parts, one part of cast or wrought metal and the other part of steel. These two parts should be brazed or otherwise fastened together at the pointed end and made smooth, so that the grass will not catch or lodge against it. One great object to be gained in this construction is to get a steel cutting-edge in the guard.

II. I construct a device for holding the finger-bar and cutters in the positions desired the cutting grass and grain, which device, as a whole, I call a "clamp," and also consider it as a part of the frame of the machine. It is made in three pieces, of cast-iron or other material, a side view of which when combined and bolted together is represented in Fig. V.

G represents the foundation or runner part, and H H two braces or supports extending forward and backward and fastened to the cross-timbers T T, Fig. II. The backward brace part, by means of two screw-bolts, one of which is shown at *b*, Fig. V, holds the finger-bar firmly in the runner. The finger-bar being fitted into the open mortise R, it is held by compression. The finger-bar is thus held securely and firmly without any bolt passing through it, by reason of which a finger-bar of less width can be used and still retain sufficient strength, as it is not cut away for the passage of bolts. The forward brace is also bolted to the runner part, as represented at *b e*, Fig. V. The brace parts of the clamp extend on an angle upward and are connected to the cross-timbers T T. The clamp is thus made a part of the frame, and the frame is thereby brought down to the ground and forms a runner, bearing on the ground at a right line with the nadir of the driving-wheel. It also receives and holds the finger-bar and cutters at the proper height for mowing, and may be raised and held at the proper height for reaping. The frame of the machine being thus lowered to the ground, the finger-bar can be connected and held to the frame without any intermediate device. By this arrangement of the frame the whole machine is kept upright and rendered of easy draft when mowing, for the reason that the main weight of the machine as a whole rests upon the ground at two points—to wit, at the nadir or bottom of the driving-wheel and the runner G. These two points being about three feet apart and always in line, the machine is well balanced and relieved from a side draft and twisting strain of the finger-bar. When the finger-bar is disconnected from the frame, the machine remains upright, and may be as conveniently moved from field to field, as if supported upon two wheels. The runner part being made broad and smooth on the bottom, it slides over the grass stubble easily and smoothly and serves to tread down the loose and mown grass and keep it away from the cutters when mowing. The forward brace part has an angular projection, as seen at I, Fig. II, for the cutting-tooth to cut against, and also to brace against the guard-finger. The upper ends of the brace parts present a perpendicular outside surface for the purpose of connecting with the cast-iron frames K K, Figs. V, III, and I, and by these frames to the cross-timbers T T. There is a long slit or opening in each of these cast-iron frames, through which slit passes a large-headed screw-bolt, and also through the perpendicular part of the clamp, as represented at *i i*, Figs. III and V. By this arrangement the clamp part of the frame may be raised or lowered on a perpendicular line, and with it the finger-bar and cutters, so that the same finger-bar and cutters may be easily and readily used for cutting grass and grain at any desirable height from the surface of the ground without change of gearing and without any additional device. When the platform R′ is attached for reaping and the finger-bar and cutters raised to the proper height the outer end of the platform and finger-bar is supported by the small wheel N, as shown in Figs. II and III. The cast-iron frames K K are bolted to the cross-timbers T T, and the bolts *i i* pass through the perpendicular part of the clamp and the cast-iron frames K K and the cross-timbers T T.

When the machine is used for mowing the platform R′ and the small wheel N and the raking apparatus are left off and the clamp part of the frame lowered to the ground, the runner G sliding upon the ground, as above set forth.

III. I construct my mold-board from a single piece of board of a peculiar form, to which is fastened two small round upright posts, the whole of which is seen at L L L, Fig. III. These posts pass through the timbers in the frame, and are free to move up or down. They cause the board to stand edgewise on the ground, forward of the finger-bar, and on an angle sufficient to move the mown grass, which may be forward of the cutters, to the inside of the clamp part of the frame. All obstructions from the mown grass is thereby avoided. This device is only designed to be used when cutting grass.

IV. My improved brake-off consists of a right-angled post or stanchion, made of wood or metal, with a pivotal motion on the frame-stock of the machine, (see S, Fig. III,) and supporting upon its upright half a crooked lever, made of wood or metal, to which lever is attached a rake, the different positions of which are seen at O O O, Figs. I, II, and III. This lever or rake-handle has a pivotal motion on the post or stanchion, as seen at P, Figs. I and III. By the combination of these two pivotal motions of the stanchion and the lever a direct line motion can be given to the rake when needed, as also a circular motion. This arrangement is operated by a man on the machine, near the driving-wheel, who grasps the lever with one hand and the stanchion with the other hand, and who can easily throw the rake into any position required and sweep the grain in bundles from the platform.

If preferred by any operator, the pivotal motion of the post or stanchion at S can be dispensed with and a universal-joint action of the rake or lever made at P, in which case the operator would grasp the rake-lever with both hands and remove the grain from the platform with the circular motion.

I claim—

1. Extending or widening out the guard-finger, substantially as herein described and represented, by the overhanging bars *m m*, Fig. IV, for the purposes herein set forth.

2. Dropping that part of the frame herein called the "clamp" down to the ground, in the manner above set forth, when constructed, arranged, located, and used substantially as herein described.

3. The mold-board L, constructed and used for the purpose and substantially as herein set forth.

4. The arrangement and combination of a right-angled stanchion made of wood or metal, with a pivotal motion on the frame-work of the machine, and supporting upon its upright part a lever made of wood or metal, with a pivotal motion on the said stanchion or post, to which lever is attached a rake; by the combination and operation of these two pivotal motions of the stanchion and lever, as set forth, a direct-line motion may be given to the rake when needed, and also a circular motion, so that a person may remove the grain from the platform in bundles and set or stand on the machine, near the driving-wheel, as herein described.

ELIAKIM B. FORBUSH.

Witnesses:

JOHN S. HOLLINGSHEAD,

E. G. HANDY.